United States Patent
Chugtu et al.

(10) Patent No.: US 10,484,392 B2
(45) Date of Patent: Nov. 19, 2019

(54) ISOLATING CONTAINERS ON A HOST

(71) Applicant: Verizon Patent and Licensing Inc., Arlington, VA (US)

(72) Inventors: Manish Chugtu, Bedford, MA (US); Karan Kapoor, Boston, MA (US); Damascene M. Joachimpillai, Westford, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 120 days.

(21) Appl. No.: 15/699,611

(22) Filed: Sep. 8, 2017

(65) Prior Publication Data
US 2019/0081955 A1   Mar. 14, 2019

(51) Int. Cl.
*H04L 29/06* (2006.01)
*H04L 12/851* (2013.01)

(52) U.S. Cl.
CPC ........ *H04L 63/105* (2013.01); *H04L 47/2441* (2013.01); *H04L 63/0236* (2013.01); *H04L 63/0263* (2013.01)

(58) Field of Classification Search
CPC ............... H04L 45/586; H04L 61/2007; H04L 61/2514; H04L 61/256; H04L 41/0816
See application file for complete search history.

(56) References Cited

U.S. PATENT DOCUMENTS

| | | | |
|---|---|---|---|
| 9,521,115 B1* | 12/2016 | Woolward | H04L 63/0263 |
| 9,973,566 B2* | 5/2018 | Hebert | H04L 67/10 |
| 2017/0093922 A1* | 3/2017 | Duan | H04L 63/1408 |
| 2017/0272400 A1* | 9/2017 | Bansal | H04L 41/0806 |
| 2018/0137296 A1* | 5/2018 | Cahana | G06F 21/629 |
| 2018/0375825 A1* | 12/2018 | Nataraja | H04L 61/256 |

OTHER PUBLICATIONS

Sreenvias Makam, MACVLAN and IPVLAN Basics, May 29, 2016, 10 Pages (Year: 2016).*

* cited by examiner

*Primary Examiner* — Christopher C Harris (57) ABSTRACT

A device can receive a request to deploy, on the device, a container associated with a tenant. The request can include information identifying one or more parameters related to the container. The device can configure, for the container, an Internet protocol (IP) address that includes information identifying the tenant with which the container is associated. The IP address can permit the container to be reachable from outside of the device. The device can configure an interface for the container to isolate the container from another container deployed on the device. The other container can be associated with another tenant. The tenant and the other tenant can be different. The device can configure a set of rules related to traffic associated with the container. The device can perform an action related to the container after deploying the container with the IP address, the interface, and the set of rules.

20 Claims, 6 Drawing Sheets

FIG. 5

ISOLATING CONTAINERS ON A HOST

BACKGROUND

Containers can include self-contained execution environments for virtualization (e.g., operating system level environments or application level environments). The containers can operate in both cloud networks and non-cloud environments, as well as other virtualization environments. For example, some containers are multi-platform based, open source software packages that encapsulate applications in containers. The encapsulation includes a filesystem with code, a runtime system, system tools, and libraries that would otherwise normally be installed on a server.

DETAILED DESCRIPTION OF PREFERRED EMBODIMENTS

The following detailed description of example implementations refers to the accompanying drawings. The same reference numbers in different drawings can identify the same or similar elements.

Containers can be used to provide applications associated with various services. In some cases, different containers on the same host (e.g., a server device) can be associated with different tenants. Isolating containers based on a service, application, and/or tenant with which the container is associated can be beneficial for security purposes. Some techniques to isolate containers can include using network overlays or encapsulation of packets. While these techniques can result in isolation of containers, these techniques can include significant overhead (e.g., increased consumption of resources, such as processing resources, memory resources, bandwidth resources, etc.).

Some implementations, described herein, provide a device that is capable of controlling an Internet protocol (IP) addressing scheme for a container, configuring a set of rules (e.g., firewall rules) for the container, and/or configuring an interface related to the container. In this way, the server device can isolate the container, such that the container cannot communicate with other containers associated with a different service, application, and/or tenant (e.g., even when the containers are on the same host). This increases a security of the container by reducing or eliminating communication between containers associated with different applications, tenants, and/or services. In addition, this simplifies management of security related to containers by distributing control for a security policy to the container level. Further, this permits containers on a host to belong to the same layer 2 domain (e.g., layer 2 of the Open System Interconnection (OSI) model), thereby reducing or eliminating a need to have dedicated hosts for each layer 2 domain, which simplifies deployment of layer 2 domains.

Figure 1A:
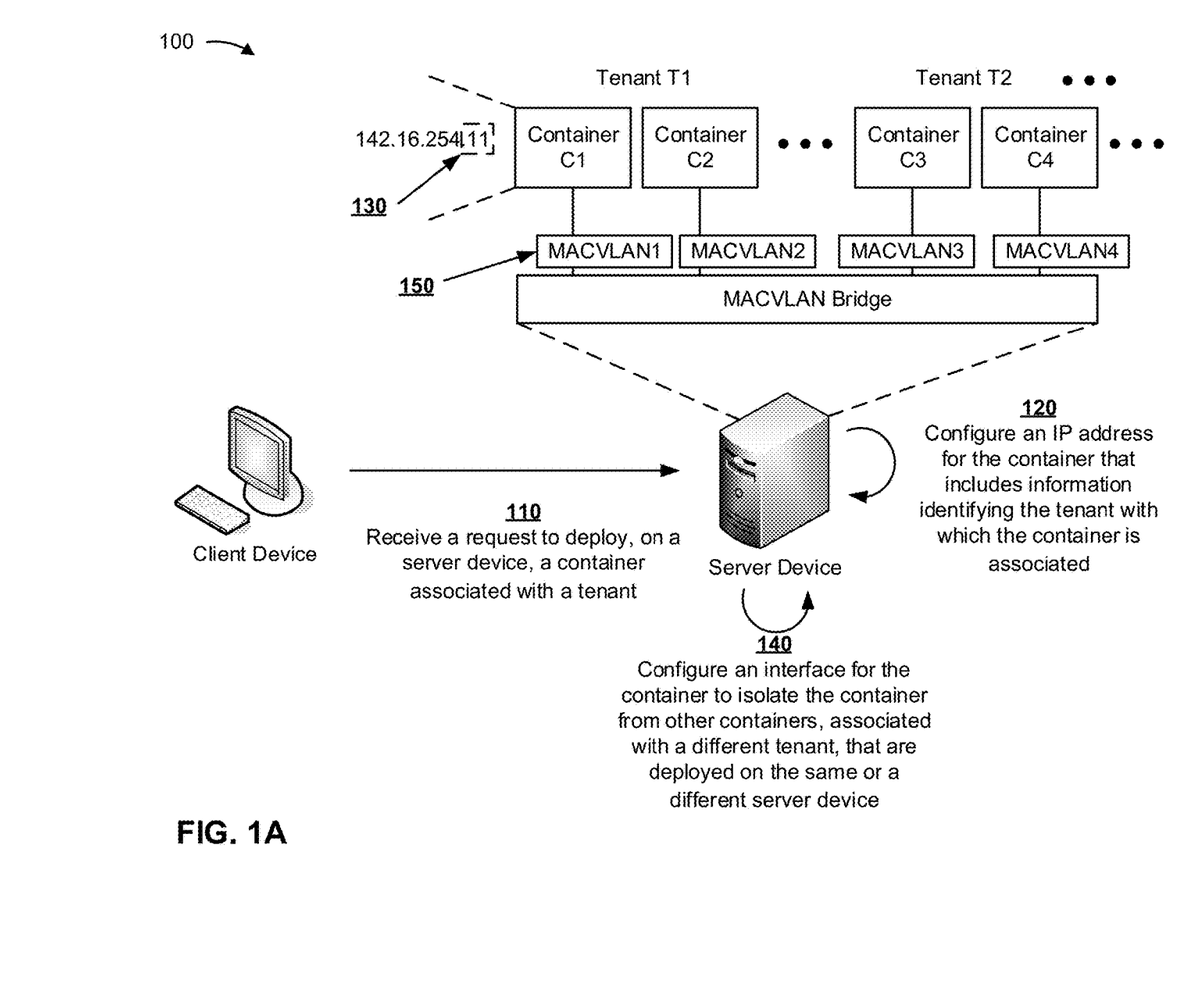
FIGS. 1A and 1B are diagrams of an overview of an example implementation described herein.
Figure 1B:
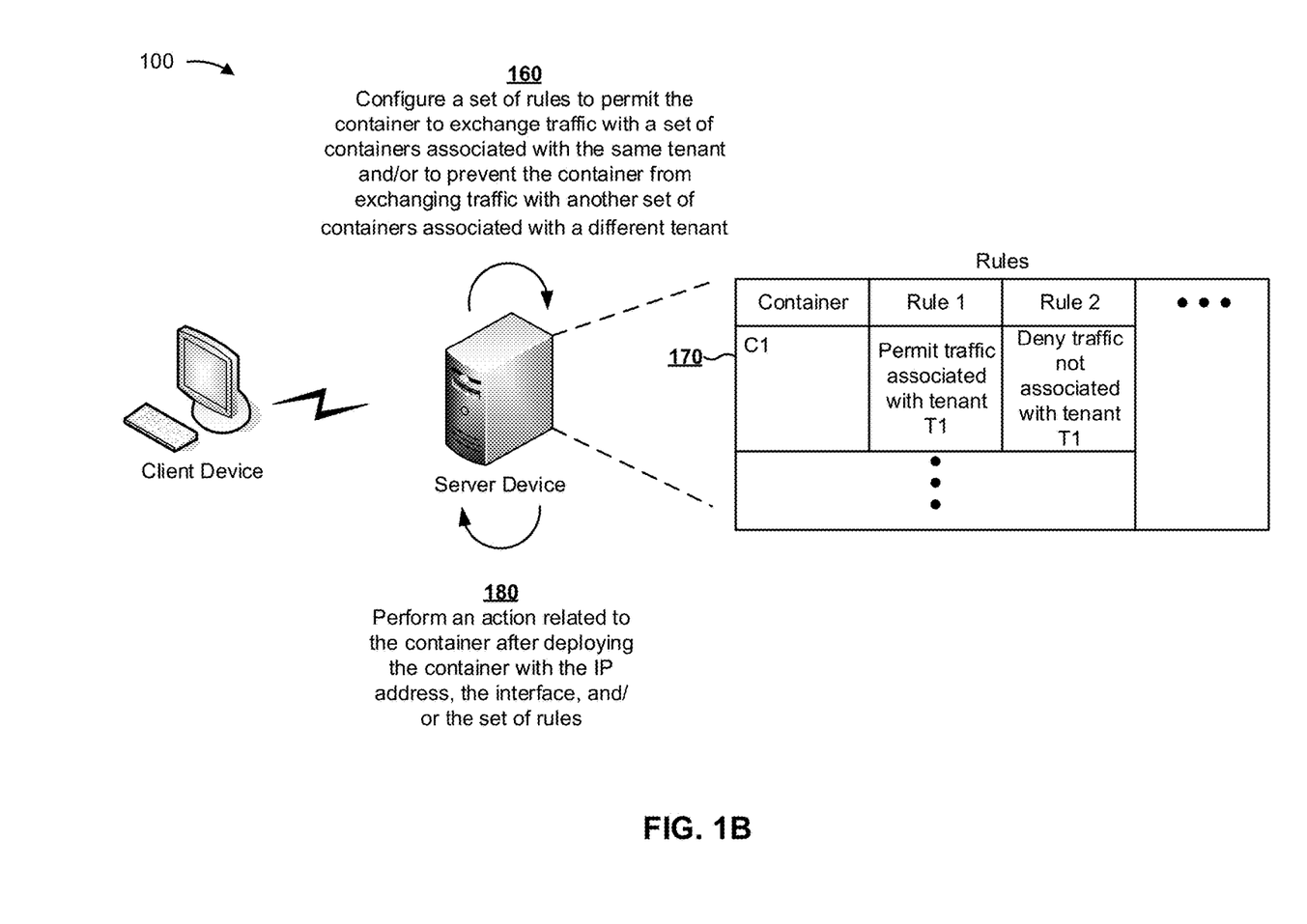

FIGS. 1A and 1B are diagrams of an overview of an example implementation 100 described herein. As shown in FIGS. 1A and 1B, example implementation 100 can include a client device, and a server device (e.g., that hosts containers associated with various tenants, services, and/or applications). Although a single client device and a single server device are shown in FIGS. 1A and 1B, in practice there can be hundreds, thousands, etc. of client devices and/or server devices (e.g., as can be deployed with respect to a data center).

As shown in FIG. 1A, and by reference number 110, the server device can receive a request to deploy, on a server device, a container associated with a tenant. For example, the server device can receive the request from the client device. In some implementations, the request can include information identifying parameters of the container to be deployed. For example, the request can include an application identifier of an application associated with the container, a quantity of central processing units (CPUs) needed for the container, an amount of memory to be allocated for the container, a network identifier of a network on which the container is to be deployed, and/or the like. In practice, the server device can receive hundreds, thousands, millions, etc. of requests to deploy hundreds, thousands, millions, etc. of containers. In this way, the server device can receive a quantity of requests that cannot be processed manually or objectively by a human actor.

As further shown in FIG. 1A, and by reference number 120, the server device can configure an IP address for the container that includes information identifying the tenant with which the container is associated. For example, the server device can configure the IP address according to a set of rules (e.g., an IP addressing scheme, an IP address management (IPAM) system, etc.) such that the IP address can be used to identify the container and/or a tenant with which the container is associated. Continuing with the previous example, and as shown by reference number 130, the server device can configure the IP address such that the last octet of an IP address (e.g., a 32-bit IP address, a 128-bit IP address, etc.) identifies the container and/or a tenant with which the container is associated (e.g., includes, in the last octet of the IP address, information that identifies a tenant with which a container is associated, such as a tenant identifier). Configuring an IP address for a container in this manner permits other containers to identify a tenant with which the container is associated. Furthermore, this permits configuration of a set of security rules to prevent a container from communicating with other containers associated with other tenants, as described in more detail elsewhere herein.

As further shown in FIG. 1A, and by reference number 140, the server device can configure an interface for the container to isolate the container from other containers, associated with a different tenant, that are deployed on the same or a different server device. For example, and as shown by reference number 150, the server device can configure a media access control (MAC) virtual local area network (VLAN) (MACVLAN) interface for the container (e.g., rather than a virtual Ethernet interface). Continuing with the previous example, the MACVLAN interface can connect the container to a MACVLAN bridge (e.g., that routes packets to a destination MACVLAN interface), rather than another type of bridge, such as a Linux bridge.

By configuring the interface, the server device can isolate containers hosted on the same server device. For example, by using a MACVLAN interface, the server device can permit multiple layer 2 devices to share the same physical interface. In addition, by using the MACVLAN bridge, the server device permits multiple containers to connect to the same bridge without permitting broadcast traffic among the multiple containers. In this way, the server device prevents a container connected to the MACVLAN bridge from sniffing traffic associated with another container connected to the same MACVLAN bridge.

As shown in FIG. 1B, and by reference number 160, the server device can configure a set of rules to permit the container to exchange traffic with a set of containers associated with the same tenant and/or to prevent the container from exchanging traffic with another set of containers associated with the same or a different tenant. For example, the server device can configure a set of firewall rules for the container. Continuing with the previous example, the server device can configure a first rule for a container that permits the container to receive and/or provide traffic associated with a particular tenant. Additionally, or alternatively, and as another example, the server device can configure a second rule that prevents the container from receiving and/or providing traffic associated with other tenants.

Reference number 170 shows an example of the set of rules configured for a container. As shown, the server device can configure a first rule (shown as "Rule 1") for container C1 that permits traffic associated with tenant T1. This permits container C1 to communicate with other containers associated with tenant T1. As further shown, the server device can configure a second rule (shown as "Rule 2") for container C1 that denies traffic not associated with tenant T1. This prevents container C1 from communicating with containers associated with tenants other than tenant T1. Configuring a set of rules for a container in this manner isolates the container from other containers associated with other tenants, even when the container and the other containers are hosted on the same server device, thereby increasing a security of traffic associated with a tenant.

As further shown in FIG. 1B, and by reference number 180, the server device can perform an action related to the container after deploying the container with the IP address, the interface, and/or the set of rules. For example, the server device can report the IP address, resource usage information, and/or the like to another device, or element of a data center, such as a resource manager, a domain name server (DNS), and/or the like. Additionally, or alternatively, and as another example, the container can provide a service and/or an application, and the server device can handle transactions related to the service and/or application (e.g., load balance transactions, log transactions, etc.).

Additionally, or alternatively, and as another example, the server device can end the container when the container is no longer needed. In this case, there is no need for server device to remove the set of rules from memory, as the rules were configured within the container, and are thereby removed when the container ends. This increases an efficiency of ending deployment of a container and/or conserves processing resources of the server device that would otherwise be consumed removing the set of rules from memory of the server device after deployment of the container ends.

In this way, a server device can isolate a container, such that the container cannot communicate with other containers associated with a different service, application, and/or tenant. This increases a security of the container by reducing or eliminating communication between containers associated with different applications, tenants, and/or services. In addition, this simplifies management of security related to containers by distributing control for a security policy to the container level. Further, this permits containers on a host to belong to the same layer 2 domain, thereby reducing or eliminating a need to have dedicated hosts for each layer 2 domain.

As indicated above, FIGS. 1A and 1B are provided merely as an example. Other examples are possible and can differ from what was described with regard to FIGS. 1A and 1B.

Figure 2:
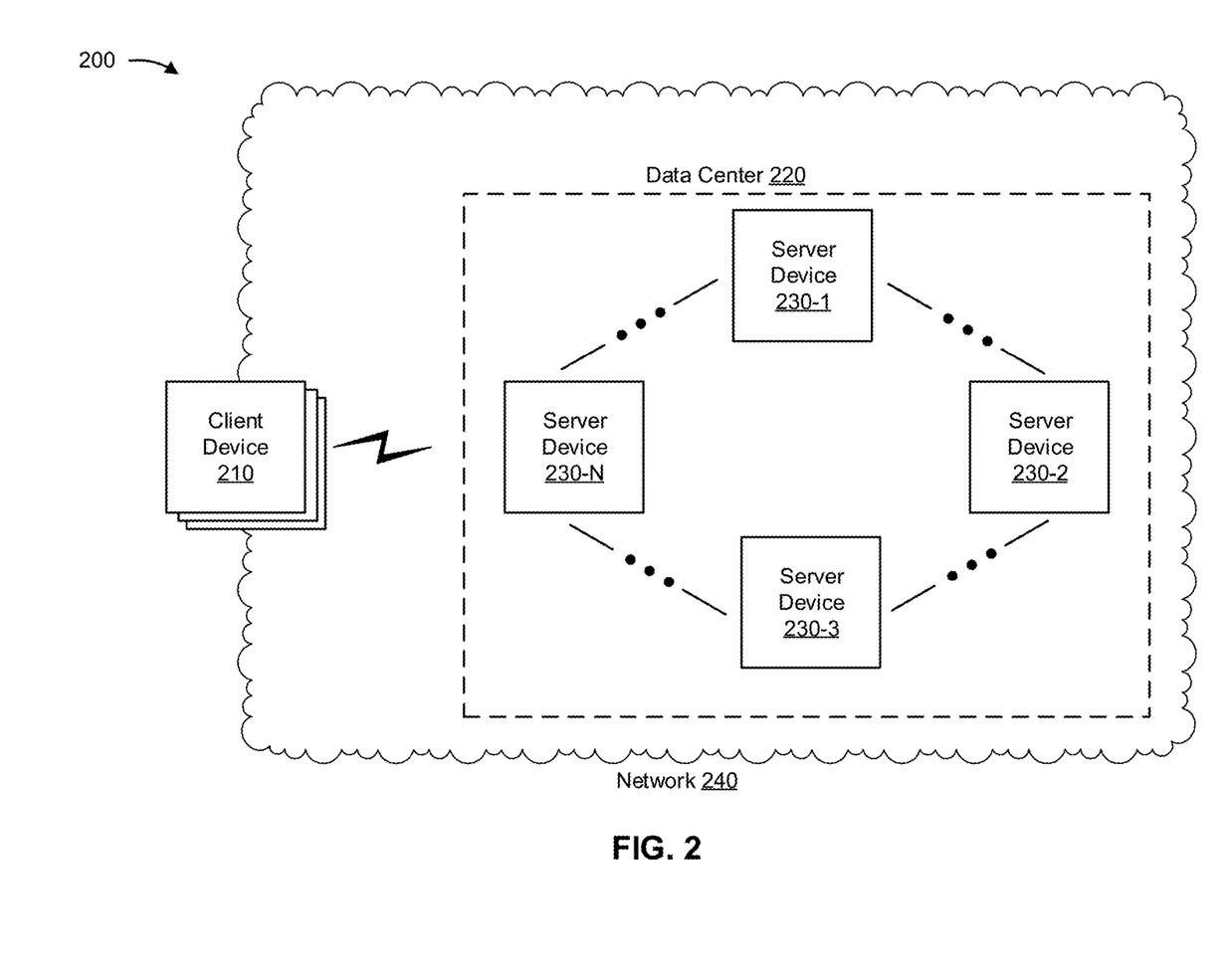
FIG. 2 is a diagram of an example environment in which systems and/or methods, described herein, can be implemented.

FIG. 2 is a diagram of an example environment 200 in which systems and/or methods, described herein, can be implemented. As shown in FIG. 2, environment 200 can include a set of client devices 210, a data center 220, one or more server devices 230-1 through 230-N (N≥1) (hereinafter referred to collectively as "server devices 230," and individually as "server device 230"), and a network 240. Devices of environment 200 can interconnect via wired connections, wireless connections, or a combination of wired and wireless connections.

Client device 210 includes one or more devices capable of receiving, generating, storing, processing, and/or providing information associated with a container. For example, client device 210 can include a mobile phone (e.g., a smart phone, a radiotelephone, etc.), a laptop computer, a desktop computer, a tablet computer, a handheld computer, a gaming device, a wearable communication device (e.g., a smart wristwatch, a pair of smart eyeglasses, etc.), or a similar type of device. In some implementations, client device 210 can provide a request to server device 230 to deploy a container, as described elsewhere herein. Additionally, or alternatively, client device 210 can use a deployed container to access a service and/or an application, to perform a task, and/or the like.

Data center 220 includes a logical or physical grouping of devices (e.g., a set of server devices 230). For example, data center 220 can include a facility that houses a set of server devices 230, a cloud-based grouping of a set of server devices 230 (e.g., where a physically distributed set of server devices 230 is grouped), and/or the like. In some implementations, data center 220 can provide a service (e.g., a data access service, a data modification service, a storage service, etc.) to client device 210, can host an application (e.g., that can be accessed by client device 210), and/or the like, as described elsewhere herein.

Server device 230 includes one or more devices capable of receiving, generating, storing, processing, and/or providing information associated with a container. For example, server device 230 can include a server (e.g., in a data center, such as data center 220, or a cloud computing environment), data center 220 (e.g., a multi-server micro data center 220), a workstation computer, a virtual machine (VM) provided in a cloud computing environment, or a similar type of device. As other examples, server device 230 can be another type of device, such as a modem, a firewall, a router, a gateway, a switch, a hub, a bridge, a reverse proxy (e.g., a proxy server), a security device, an intrusion detection device, a load balancer, or a similar type of device. In some implementations, server device 230 can receive a request, from client device 210, to deploy a container, as described elsewhere herein. Additionally, or alternatively, server device 230 can deploy the container based on the request, as described elsewhere herein. In some implementations, server device 230 can be a physical device implemented within a housing, such as a chassis. Additionally, or alternatively, server device 230 can a virtual device implemented by one or more computer devices of a cloud computing environment or data center 220.

Network 240 includes one or more wired and/or wireless networks. For example, network 240 can include a cellular network (e.g., a long-term evolution (LTE) network, a code division multiple access (CDMA) network, a 3G network, a 4G network, a 5G network, another type of cellular network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

The number and arrangement of devices and networks shown in FIG. 2 are provided as an example. In practice, there can be additional devices and/or networks, fewer devices and/or networks, different devices and/or networks, or differently arranged devices and/or networks than those shown in FIG. 2. Furthermore, two or more devices shown in FIG. 2 can be implemented within a single device, or a single device shown in FIG. 2 can be implemented as multiple, distributed devices. Additionally, or alternatively, a set of devices (e.g., one or more devices) of environment 200 can perform one or more functions described as being performed by another set of devices of environment 200.

Figure 3:
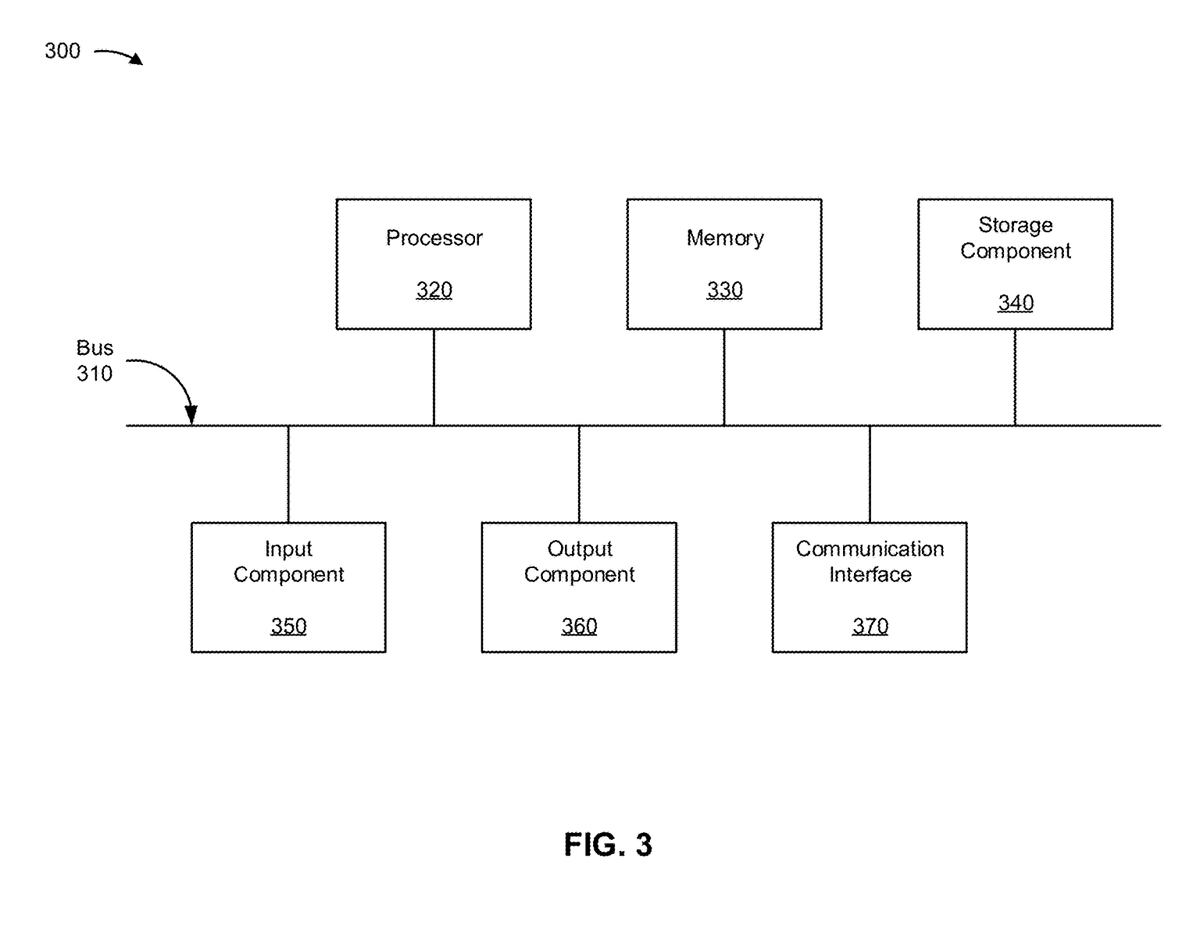
FIG. 3 is a diagram of example components of one or more devices of FIG. 2.

FIG. 3 is a diagram of example components of a device 300. Device 300 can correspond to client device 210, data center 220, and/or server device 230. In some implementations, client device 210, data center 220, and/or server device 230 can include one or more devices 300 and/or one or more components of device 300. As shown in FIG. 3, device 300 can include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 can include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 can include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 can permit device 300 to receive information from another device and/or provide information to another device. For example, communication interface 370 can include an Ethernet interface, an optical interface, a coaxial interface, an infrared interface, a radio frequency (RF) interface, a universal serial bus (USB) interface, a Wi-Fi interface, a cellular network interface, or the like.

Device 300 can perform one or more processes described herein. Device 300 can perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions can be read into memory 330 and/or storage component 340 from another computer-readable medium or from another device via communication interface 370. When executed, software instructions stored in memory 330 and/or storage component 340 can cause processor 320 to perform one or more processes described herein. Additionally, or alternatively, hardwired circuitry can be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 can include additional components, fewer components, different components, or differently arranged components than those shown in FIG. 3. Additionally, or alternatively, a set of components (e.g., one or more components) of device 300 can perform one or more functions described as being performed by another set of components of device 300.

Figure 4:
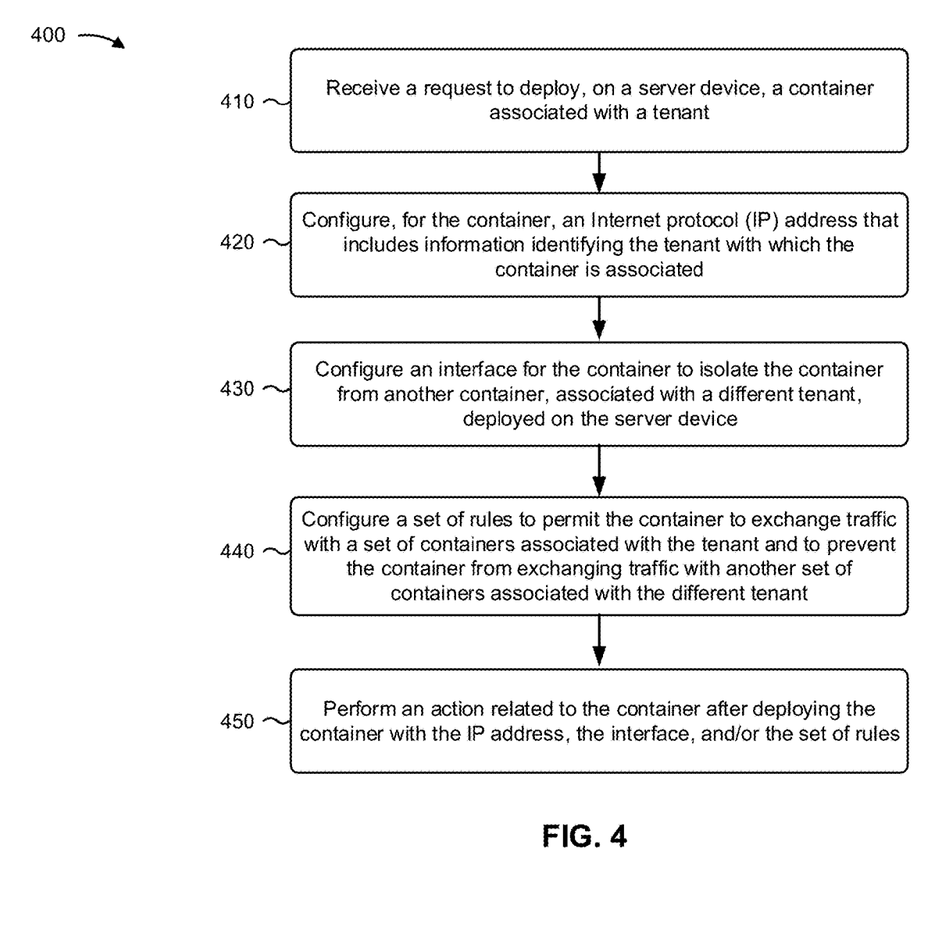
FIG. 4 is a flow chart of an example process for isolating containers on a host.

FIG. 4 is a flow chart of an example process 400 for isolating containers on a host. In some implementations, one or more process blocks of FIG. 4 can be performed by server device 230. In some implementations, one or more process blocks of FIG. 4 can be performed by another device or a group of devices separate from or including server device 230, such as client device 210 and data center 220.

As shown in FIG. 4, process 400 can include receiving a request to deploy, on a server device, a container associated with a tenant (block 410). For example, server device 230 can receive a request to deploy a container (e.g., from client device 210). In some implementations, a container can be associated with a tenant (e.g., a service, an application, etc.). In some implementations, server device 230 can receive hundreds, thousands, millions, etc. of requests to deploy hundreds, thousands, millions, etc. of containers. In this way, server device 230 can receive a set of requests that cannot be processed manually or objectively by a human actor. In some implementations, server device 230 can receive a request periodically, according to a schedule, based on input from a user of client device 210, and/or the like.

In some implementations, a request can include a request to deploy a container (e.g., on a particular server device 230, associated with a particular tenant, etc.). In some implementations, a request can include information related to a container to be deployed (e.g., a parameter for the container). For example, the request can include information identifying an amount of resources to be provided for the container (e.g., an amount of memory, a quantity of CPUs, etc.), a type of the container (e.g., a Docker container, a Linux Container, a free Berkeley software distribution jail (FreeBSD jail), etc.), an image of the container (e.g., an executable that includes information related to running software, such as code, libraries, configuration files, etc. related to the container), a network with which the container is to be associated, a tenant with which the container is to be associated, an identifier that identifies the container, and/or the like.

In this way, server device 230 can receive a request to deploy a container prior to configuring an IP address for the container.

As further shown in FIG. 4, process 400 can include configuring, for the container, an Internet protocol (IP) address that includes information identifying the tenant with which the container is associated (block 420). For example, server device 230 can configure an IP address for the container. In some implementations, the IP address can include information that identifies a tenant with which the container is associated. In some implementations, an IP address can be an IP version four (IPv4) address, an IPv6 address, or another type of IP address.

In some implementations, an IP address that server device 230 configures can have a particular format. For example, the IP address can include information identifying a network, a rack, a rack unit, a tenant, and/or a container with which the IP address is associated. Continuing with the previous example, for a 32-bit IP address, the first octet can identify the network, the second octet can identify the rack, the third octet can identify the rack unit, and the fourth octet can identify both the container and the tenant with which the IP address is associated.

In some implementations, for the fourth octet, a quantity of bits that identify the container and tenant can be variable depending on a quantity of tenants and/or containers associated with the network, rack, and/or rack unit. For example, for the fourth octet, 4 bits can be used to identify the tenant and the other 4 bits can be used to identify the container, 2 bits can be used to identify the tenant and the other 6 bits can be used to identify the container, 6 bits can be used to identify the tenant and the other 2 bits can be used to identify the container, 1 bit can be used to identify the tenant and the other 7 bits can be used to identify the container, and so forth.

This improves use of an IP address to identify a container and/or tenant by permitting flexibility with respect to the quantity of containers and/or tenants that can be identified by the IP address. In addition, using an IP address with this type of format permits server device 230 to configure rules related to traffic associated with different tenants, as described in more detail elsewhere herein. Further, this reduces or eliminates a need for IP routing at a host (e.g., server device 230) level as containers are directly reachable from outside server device 230, thereby conserving processing resources of server device 230 that would otherwise be consumed routing traffic to a container.

In some implementations, server device 230 can perform a lookup to determine the IP address to be configured for the container. For example, server device 230 can perform a lookup of information related to the container to determine the IP address. Continuing with the previous example, server device 230 can perform a lookup of information that identifies a tenant with which the container is associated, and can identify a tenant identifier to include in the IP address when the lookup indicates a match. In some implementations, server device 230 can determine an IP address to configure for a container based on a result of the lookup (e.g., where a result of the lookup indicates a match).

In some implementations, server device 230 can determine a tenant with which the container is to be associated by processing information included in the request. For example, server device 230 can process information included in the request to identify a tenant identifier that identifies the tenant with which the container is to be associated. Additionally, or alternatively, and as another example, server device 230 can determine the tenant based on a combination and/or amount of resources requested for the container (e.g., where server device 230 has been trained on data that identifies combinations and/or amounts of requested resources and corresponding tenants).

In this way, server device 230 can configure an IP address for the container prior to, or in association with, configuring an interface for the container.

As further shown in FIG. 4, process 400 can include configuring an interface for the container to isolate the container from another container, associated with a different tenant, deployed on the server device (block 430). For example, server device 230 can configure an interface for the container. In some implementations, the interface configured for the container can isolate the container from another container deployed on server device 230 (e.g., another container associated with a different tenant than the container). In some implementations, server device 230 can configure the interface after, prior to, or in association with configuring an IP address for the container. In some implementations, server device 230 can configure interfaces for hundreds, thousands, etc. of containers.

In some implementations, server device 230 can configure a particular type of interface for a container. For example, server device 230 can configure a MACVLAN interface for a container deployed on server device 230 (e.g., where the container has a different MAC address from other containers deployed on server device 230), rather than configure a virtual Ethernet interface. In some implementations, configuring a MACVLAN interface can permit multiple containers to share the same physical interface (e.g., a network interface card (NIC)) without permitting the containers to receive traffic associated with another container.

In some implementations, server device 230 can configure a bridge to connect multiple containers hosted on server device 230 to a physical interface associated with server device 230. For example, server device 230 can configure a bridge such that a container connected to the bridge cannot read or sniff packets associated with other containers with which the container is not communicating. Continuing with the previous example, server device 230 can configure a MACVLAN bridge that connects the containers to a NIC, an Ethernet interface, and/or the like (e.g., rather than configure a Linux bridge). Configuring an interface and/or bridge in this manner blocks broadcast traffic from containers deployed on the same server device 230, containers associated with different tenants, and/or the like. In addition, a MACVLAN bridge can provide hardware offload for operations related to the container, thereby conserving processing resources, such as CPU cycles, related to server device 230.

In this way, server device 230 can configure an interface for the container prior to, or in association with, configuring a set of rules related to traffic to and/or from the container.

As further shown in FIG. 4, process 400 can include configuring a set of rules to permit the container to exchange traffic with a set of containers associated with the tenant and to prevent the container from exchanging traffic with another set of containers associated with the different tenant (block 440). For example, server device 230 can configure a set of rules for the container. In some implementations, server device 230 can configure a set of rules to permit traffic associated with a particular container and/or tenant, to permit traffic not associated with a particular container and/or tenant, and/or the like. Additionally, or alternatively, server device 230 can configure a set of rules to prevent traffic associated with a particular container and/or tenant, to prevent traffic not associated with a particular container and/or tenant, and/or the like.

In some implementations, the set of rules can include a set of firewall rules, a set of policies, and/or the like. In some implementations, server device 230 can configure a set of rules for each container. For example, server device 230 can configure a rule for each container that prevents the container from receiving traffic from another container associated with a different tenant (e.g., by preventing traffic from a container that has an IP address that includes a different tenant identifier than the IP address of the container). Additionally, or alternatively, and as another example, server device 230 can configure a rule for a container that prevents the container from providing traffic to another container associated with a different tenant (e.g., by preventing the container from providing traffic to another container that has an IP address that includes a different tenant identifier than the IP address of the container). Additionally, or alternatively, and as another example, server device 230 can configure a rule that permits the container to exchange traffic with another container associated with the same tenant (e.g., another container that has an IP address that includes the same tenant identifier as the container).

Additionally, or alternatively, an as another example, a set of rules can be time-based (e.g., where particular traffic is permitted at a particular time). Additionally, or alternatively, and as another example, the set of rules can be size-based (e.g., where traffic of a threshold size is permitted, where server device 230 is permitted to send/receive a threshold amount of traffic in a time period, etc.). Additionally, or alternatively, and as another example, the set of rules can be destination and/or source-based (e.g., where traffic is permitted to/from a particular destination/source, permitted from a particular source but not to the particular source, etc.). Additionally, or alternatively, and as another example, the set of rules can be location-based (e.g., based on a geographic location of server device 230, a geographic location of a source and/or destination of traffic, etc.). Additionally, or alternatively, and as another example, the set of rules can be based on a type of the traffic (e.g., text traffic, audio traffic, video traffic, etc.).

In this way, by configuring a set of rules related to the exchange of traffic, server device 230 isolates a container from another container associated with a different tenant, even if the container and the other container are hosted on the same server device 230, connected to the same network, and/or the like. Although blocks 420 through 440 have been described in a particular order, in practice, the implementations described herein with respect to blocks 420 through 440 can occur simultaneously, in a different order, and/or the like.

In this way, server device 230 can configure a set of rules prior to performing an action related to the container.

As further shown in FIG. 4, process 400 can include performing an action related to the container after deploying the container with the IP address, the interface, and/or the set of rules (block 450). For example, server device 230 can perform an action related to the container. In some implementations, server device 230 can perform an action after deploying the container with the IP address, the interface, and/or the set of rules.

In some implementations, for example, server device 230 can perform an action to provide a notification to client device 210 that a container is deployed and ready for use. Additionally, or alternatively, and as another example, server device 230 can perform an action to end the container (e.g., when the container is no longer needed, such as after a threshold amount of time, after consumption of a threshold amount of resources, at a pre-specified time, etc.). Additionally, or alternatively, and as another example, server device 230 can perform an action to record metrics related to use of the container (e.g., a speed at which the container is providing a service or an application, whether the resources requested for the container permit the container to provide a service and/or an application without errors, an amount of time the container was deployed, resources consumed by the container, etc.).

Additionally, or alternatively, and as another example, server device 230 can generate a report. For example, server device 230 can generate a report that includes information identifying a set of metrics related to the container. In some implementations, and as another example, server device 230 can store information related to use of the container to improve future deployments of containers. For example, server device 230 can use the information to determine whether a request to deploy a container includes a request for sufficient resources for the container (e.g., a threshold amount of resources), to generate a recommendation related to deployment of a container, and/or the like.

In this way, server device 230 can perform an action related to the container after deploying the container with the IP address, the interface, and/or the set of rules.

Although FIG. 4 shows example blocks of process 400, in some implementations, process 400 can include additional blocks, fewer blocks, different blocks, or differently arranged blocks than those depicted in FIG. 4. Additionally, or alternatively, two or more of the blocks of process 400 can be performed in parallel.

Figure 5:
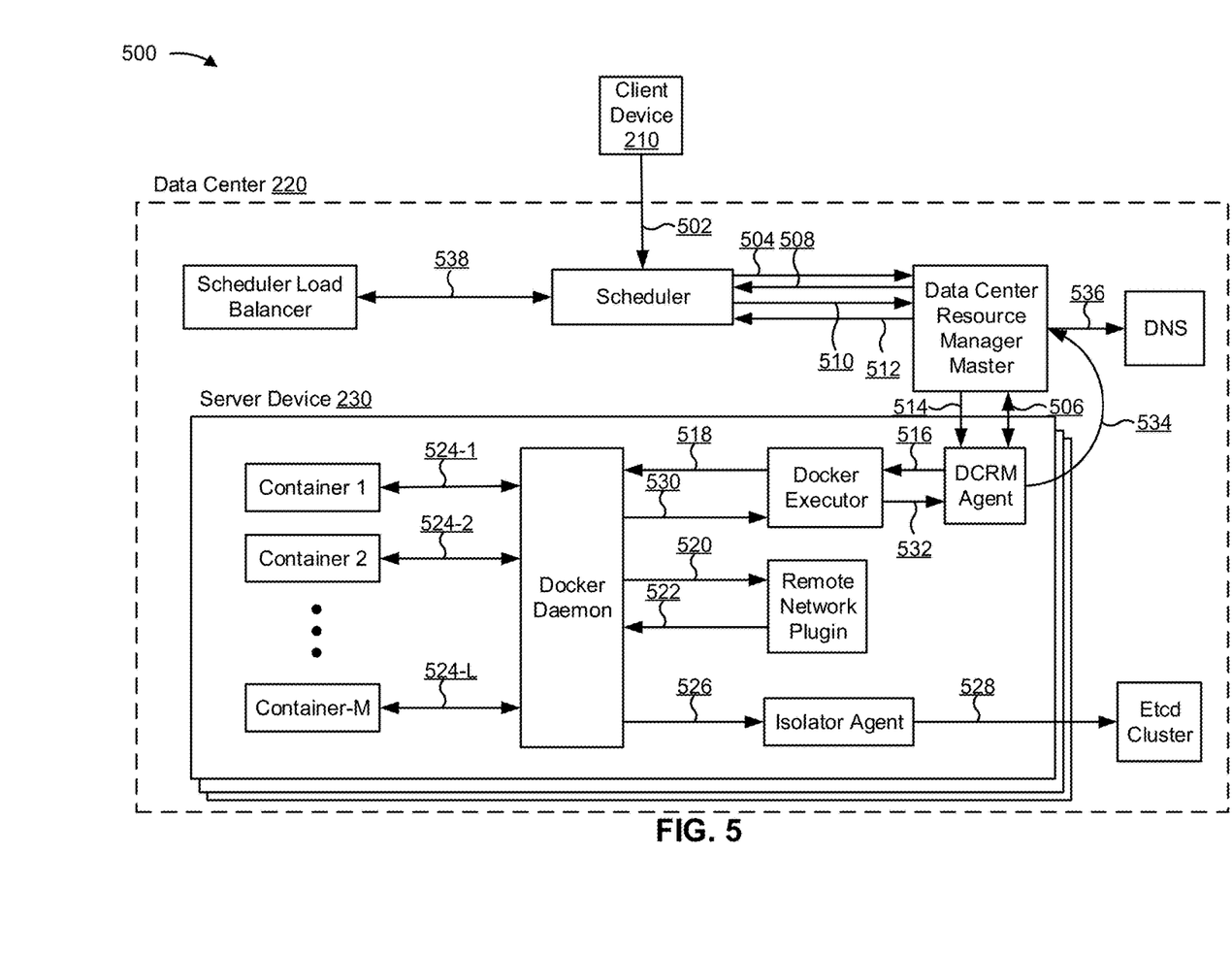
FIG. 5 is a diagram of an example implementation relating to the example process shown in FIG. 4.

FIG. 5 is a diagram of an example implementation 500 relating to example process 400 shown in FIG. 4. FIG. 5 shows an example of a system architecture that is used to isolate containers on a host and interactions among elements, components, and/or devices of the system architecture. As shown in FIG. 5, implementation 500 can include client device 210, data center 220, and server device 230. As further shown, data center 220 and server device 230 can include various elements, devices, and/or components. For example, data center 220 can include a scheduler load balancer, a scheduler, a data center resource manager (DCRM) master, a domain name server (DNS) (e.g., a resource manager integrated DNS), and an Etcd cluster. As another example, server device 230 can include a Docker daemon, a Docker executor, a remote network plugin, a DCRM agent, an isolator agent, and a set of containers (e.g., shown as container 1 through container-M, where M≥1).

As shown in FIG. 5, and by reference number 502, data center 220 can receive a request from client device 210 to deploy a container. For example, client device 210 can post an application to the scheduler (e.g., a Marathon scheduler) to cause a container to be deployed for the application. The request can include information related to the container and/or the application to be deployed, as described elsewhere herein. For example, the request can include a JavaScript Object Notation (JSON) definition of a container, an application, and/or a task (e.g., information in JSON format). As shown by reference number 504, the scheduler can request that the DCRM master (e.g., Mesos) allocate requested resources (e.g., CPUs, memory, etc.) for the application, the container, and/or the task that the scheduler is to schedule.

As shown by reference number 506, the DCRM master can communicate with the DCRM agent running on a particular server device 230 to obtain the requested resources for the container, application, and/or task. The DCRM agent can offer resources to the DCRM master based on receiving the request from the DCRM master. As shown by reference number 508, the DCRM master can provide information to the scheduler that identifies the resources that the DCRM agent offered to the DCRM master. As shown by reference number 510, the scheduler can schedule the task, application, and/or container based on the information identifying resources offered by the DCRM agent and can provide information to the DCRM master that identifies the schedule. As shown by reference number 512, the DCRM master can provide an indication to the scheduler that the task, application, and/or container is scheduled to deploy (e.g., to launch).

As shown by reference number 514, the DCRM master can provide an indication to the DCRM agent to deploy, or run, the task, application, and/or container on server device 230. As shown by reference number 516, the DCRM agent can request the Docker executor to convert the information in the request from client device 210 (described with respect to reference number 502) to run commands. For example, the DCRM agent can call the Docker executor to convert a JSON definition received from client device 210 to a set of Docker run commands.

As shown by reference number 518, the Docker executor can cause the container, application, and/or task to be deployed. For example, the Docker executor can call the Docker daemon to run the container, the application, and/or the task. As shown by reference number 520, the Docker daemon can create the container. Further, the Docker daemon can request that the remote network plugin perform a set of actions related to the container. For example, the Docker daemon can request that the remote network plugin create a MACVLAN endpoint (e.g., configure a MACVLAN interface) for the container. Additionally, or alternatively, and as another example, the Docker daemon can request that the remote network plugin assign an IP address and/or a MAC address to the container (e.g., configure an IP address for the container according to an IP address management (IPAM) scheme stored by the Docker daemon).

As shown by reference number 522, the remote network plugin can provide an indication to the Docker daemon that the container is ready for use. As shown by reference numbers 524-1 through 524-L (L≥1), the Docker daemon can be connected to a set of deployed containers (e.g., that are configured with IP addresses and/or MAC addresses according to an addressing scheme). As shown by reference number 526, the isolator agent can check the IP addresses for the container and can install (e.g., configure) a set of firewall rules inside the container. As shown by reference number 528, the isolator agent can retrieve a group (e.g., a tenant) mapping related to an Etcd cluster. For example, the group mapping can include a mapping of tenants and tenant identifiers to be included in IP addresses of containers associated with each tenant. This permits the isolator agent to check the configured IP address for the container and/or to configure firewall rules for the container.

As shown by reference number 530, the Docker daemon can provide information related to the deployed container to the Docker executor. For example, the Docker daemon can provide the information based on the Docker executor performing a Docker inspect of the container. As shown by reference number 532, the Docker executor can provide information related to the deployed container to the DCRM agent. For example, the Docker executor can report information related to the resources being used by the container to the DCRM agent.

As shown by reference number 534, the DCRM agent can provide the information received from the Docker executor to the DCRM master. As shown by reference number 536, the DCRM master can provide information identifying the IP address of the deployed container to the DNS to update the DNS (e.g., so that traffic can be directed to the container). Additionally, or alternatively, the DCRM master can provide the same information to the scheduler. As shown by reference number 538, the scheduler load balancer can subscribe to a scheduler event bus to permit the scheduler load balancer to receive information related to containers, applications, and/or tasks deployed so that the scheduler load balancer can load balance traffic, consumption of resources, etc. across server devices 230.

As indicated above, FIG. 5 is provided merely as an example. Other examples are possible and can differ from what was described with regard to FIG. 5.

Some implementations, described herein, provide a device that is capable of controlling an Internet protocol (IP) addressing scheme for a container, configuring a set of rules (e.g., firewall rules) for the container, and/or configuring an interface related to the container. In this way, the server device can isolate the container, such that the container cannot communicate with other containers associated with a different service, application, and/or tenant (e.g., even when the container and the other containers are on the same host). This increases a security of the container by reducing or eliminating communication between containers associated with different applications, tenants, and/or services. In addition, this simplifies management of security related to containers by distributing control for a security policy to the container level. Further, this permits containers on a host to belong to the same layer 2 domain, thereby reducing or eliminating a need to have dedicated hosts for each layer 2 domain, which simplifies deployment of layer 2 domains.

The foregoing disclosure provides illustration and description, but is not intended to be exhaustive or to limit the implementations to the precise form disclosed. Modifications and variations are possible in light of the above disclosure or can be acquired from practice of the implementations.

As used herein, the term component is intended to be broadly construed as hardware, firmware, or a combination of hardware and software.

Some implementations are described herein in connection with thresholds. As used herein, satisfying a threshold can refer to a value being greater than the threshold, more than the threshold, higher than the threshold, greater than or equal to the threshold, less than the threshold, fewer than the threshold, lower than the threshold, less than or equal to the threshold, equal to the threshold, or the like.

To the extent the aforementioned embodiments collect, store, or employ personal information provided by individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods, described herein, can be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features can be combined in ways not specifically recited in the claims and/or disclosed in the specification. Although each dependent claim listed below can directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   a memory to store instructions; and
   one or more processors to execute the instructions to:
   receive a request to deploy, on the device, a container associated with a tenant,
      the request including information identifying one or more parameters related to the container;
   configure, for the container, an Internet protocol (IP) address that includes information identifying the tenant with which the container is associated,
      the IP address to permit the container to be reachable from outside of the device;
   configure an interface for the container to isolate the container from another container deployed on the device,
      the other container being associated with another tenant,
      the tenant and the other tenant being different;
   configure a bridge, associated with the interface, on the device to connect the container and the other container,
      the bridge being used to prevent the container from reading or sniffing one or more packets associated with the other container;
   configure a set of rules related to traffic associated with the container,
      the set of rules to permit the container to exchange traffic with a set of containers associated with the tenant, and
      the set of rules to prevent the container from exchanging traffic with another set of containers associated with the other tenant; and
   perform an action related to the container after deploying the container with the IP address, the interface, the bridge, and the set of rules.

2. The device of claim 1, where the one or more parameters include:
   an amount of resources to be provided for the container,
   a type of the container,
   an image of the container,
   a network with which the container is to be associated,
   information identifying the tenant with which the container is to be associated, or
   an identifier that identifies the container.

3. The device of claim 1, where the one or more processors, when configuring the IP address, are to:
   configure the IP address according to a particular format; and
   where the one or more processors, when configuring the interface, are to:
   configure the interface after configuring the IP address according to the particular format.

4. The device of claim 1, where the interface is a media access control (MAC) virtual local area network (VLAN) (MACVLAN) interface.

5. The device of claim 1, where the one or more processors are further to:
   perform a lookup of information identifying the tenant;
   determine the IP address to configure based on a result of the lookup; and
   where the one or more processors, when configuring the IP address, are to:
   configure the IP address after determining the IP address.

6. The device of claim 1,
   where the one or more processors, when configuring the set of rules, are to:
   configure the set of rules after configuring the bridge.

7. The device of claim 1, where the one or more processors, when configuring the set of rules, are to:
   configure the set of rules within the container; and
   where the one or more processors, when performing the action, are to:
   perform the action after configuring the set of rule within the container.

8. A non-transitory computer-readable medium storing instructions, the instructions comprising:
   one or more instructions that, when executed by one or more processors, cause the one or more processors to:
   receive a request to deploy, on a device, a container associated with a tenant,
      the request including information identifying one or more parameters related to the container;
   configure, for the container, an Internet protocol (IP) address that includes information identifying the tenant with which the container is associated,
      the IP address to permit the container to be reachable from outside of the device;
   configure an interface for the container to isolate the container from another container deployed on the device, the other container being associated with another tenant, the tenant and the other tenant being different;

configure a bridge, associated with the interface, on the device to connect the container and the other container, the bridge being used to prevent the container from reading or sniffing one or more packets associated with the other container;

configure a set of rules related to traffic associated with the container, the set of rules to permit the container to exchange traffic with a set of containers associated with the tenant, and the set of rules to prevent the container from exchanging traffic with another set of containers associated with the other tenant; and perform an action related to the container after deploying the container with the IP address, the interface, the bridge, and the set of rules.

9. The non-transitory computer-readable medium of claim 8, where the one or more instructions, that cause the one or more processors to configure the IP address, cause the one or more processors to:

configure the IP address to include an identifier that identifies the tenant in a last octet of the IP address.

10. The non-transitory computer-readable medium of claim 8, where the one or more instructions, that cause the one or more processors to configure the bridge, cause the one or more processors to:

configure a media access control (MAC) virtual local area network (VLAN) (MACVLAN) bridge, the container to be connected to the MACVLAN bridge via the interface.

11. The non-transitory computer-readable medium of claim 8, where the one or more instructions, that cause the one or more processors to configure the set of rules, cause the one or more processors to:

configure a rule, of the set of rules, to permit the container to receive the traffic associated with the tenant.

12. The non-transitory computer-readable medium of claim 8, where the one or more instructions, that cause the one or more processors to configure the set of rules, cause the one or more processors to:

configure a rule, of the set of rules, to prevent the container from receiving the traffic associated with the other tenant.

13. The non-transitory computer-readable medium of claim 8, where the one or more instructions, that cause the one or more processors to configure the IP address, cause the one or more processors to:

configure the IP address according to a particular format, the particular format relating to an octet of the IP address.

14. The non-transitory computer-readable medium of claim 8, where the one or more instructions, that cause the one or more processors to configure the set of rules, cause the one or more processors to:

configure the set of rules using an agent associated with the device.

15. A method, comprising:

receiving, by a device, a request to deploy, on the device, a container associated with a tenant, the request including information identifying one or more parameters related to the container;

configuring, by the device and for the container, an Internet protocol (IP) address that includes information identifying the tenant with which the container is associated, the IP address to permit the container to be reachable from outside of the device;

configuring, by the device, an interface for the container to isolate the container from another container deployed on the device, the other container being associated with another tenant, the tenant and the other tenant being different;

configuring, by the device, a bridge, associated with the interface, on the device to connect the container and the other container, the bridge being used to prevent the container from reading or sniffing one or more packets associated with the other container;

configuring, by the device, a set of rules related to traffic associated with the container, the set of rules to permit the container to exchange traffic with a set of containers associated with the tenant, and the set of rules to prevent the container from exchanging traffic with another set of containers associated with the other tenant; and performing, by the device, an action related to the container after deploying the container with the IP address, the interface, the bridge, and the set of rules.

16. The method of claim 15, further comprising:

requesting that a remote network plugin configure an IP address for the container according to an IP address management (IPAM) scheme; and where configuring the IP address comprises:

configuring the IP address based on requesting that the remote network plugin configure the IP address.

17. The method of claim 15, further comprising:

requesting that a remote network plugin configure a media access control (MAC) virtual local area network (VLAN) (MACVLAN) interface for the container; and where configuring the interface comprises:

configuring the interface based on requesting that the remote network plugin configure the MACVLAN interface.

18. The method of claim 15, where configuring the IP address comprises:

configuring the IP address to include the information identifying the tenant in a last octet of the IP address.

19. The method of claim 15, further comprising:

configuring the bridge after configuring the interface, the bridge to be connected to the container and to the other container.

20. The method of claim 15, where performing the action comprises:

providing a notification to another device that indicates that the container is deployed.

* * * * *